United States Patent [19]

Furuhashi et al.

[11] Patent Number: 4,993,836

[45] Date of Patent: Feb. 19, 1991

[54] METHOD AND APPARATUS FOR MEASURING FORM OF THREE-DIMENSIONAL OBJECTS

[75] Inventors: Nakatomo Furuhashi; Yuichi Ono, both of Tsukuba; Hiroaki Moritani, Fuchu; Hiroshi Kobayashi, Muroran, all of Japan

[73] Assignees: Agency of Industrial Science & Technology, Tokyo, Japan; Ministry of International Trade & Industry, Tokyo, Japan

[21] Appl. No.: 324,803

[22] Filed: Mar. 17, 1989

[30] Foreign Application Priority Data

Mar. 22, 1988 [JP] Japan .................................. 63-65737

[51] Int. Cl.$^5$ ............................................. G01B 11/24
[52] U.S. Cl. .................................... 356/376; 356/426; 358/88; 358/107
[58] Field of Search .................... 356/2, 372, 373, 375, 356/276, 377, 426; 358/88, 96, 107; 250/558

[56] References Cited

U.S. PATENT DOCUMENTS 4,858,157  8/1989  Murai et al. ............................ 356/2

FOREIGN PATENT DOCUMENTS

25003  2/1986  Japan .................................. 356/376
29704  2/1986  Japan .................................. 356/375

Primary Examiner—F. L. Evans
Attorney, Agent, or Firm—Oblon, Spivak, McClelland, Maier & Neustadt

[57] ABSTRACT

A method and apparatus for measuring the cross-sectional or three-dimensional form of an object using video cameras. The object or the camera means is moved to provide a partial overlap on the measurement object, and local form segments of the object are measured and the segments are connected to synthesize a stereo image of the form of the object, unaffected by fluctuations in the motion of the measurement system.

5 Claims, 7 Drawing Sheets

METHOD AND APPARATUS FOR MEASURING FORM OF THREE-DIMENSIONAL OBJECTS

BACKGROUND OF THE INVENTION

1. Field of the Invention

This invention relates to a method and apparatus for measuring the cross-sectional or three-dimensional form of an object using an apparatus that has imaging capabilities such as an ITV camera or a CCD camera.

2. Description of the Prior Art

In the steps of manufacturing, processing and inspecting various industrial products, in addition to one or two dimensional data such as width, height and area it is often necessary to measure three dimensional aspects of a product such as its cross-sectional form, in order to determine its roundness, for example. Generally, also, in the case of industrial products it often desirable that the measurement procedures be quick and non-contact.

For such purposes, various form measurement methods have been tried that employ imaging devices such as ITV cameras. Typical examples of these conventional methods will now be described with reference to FIGS. 10 and 11.

Figure 10:
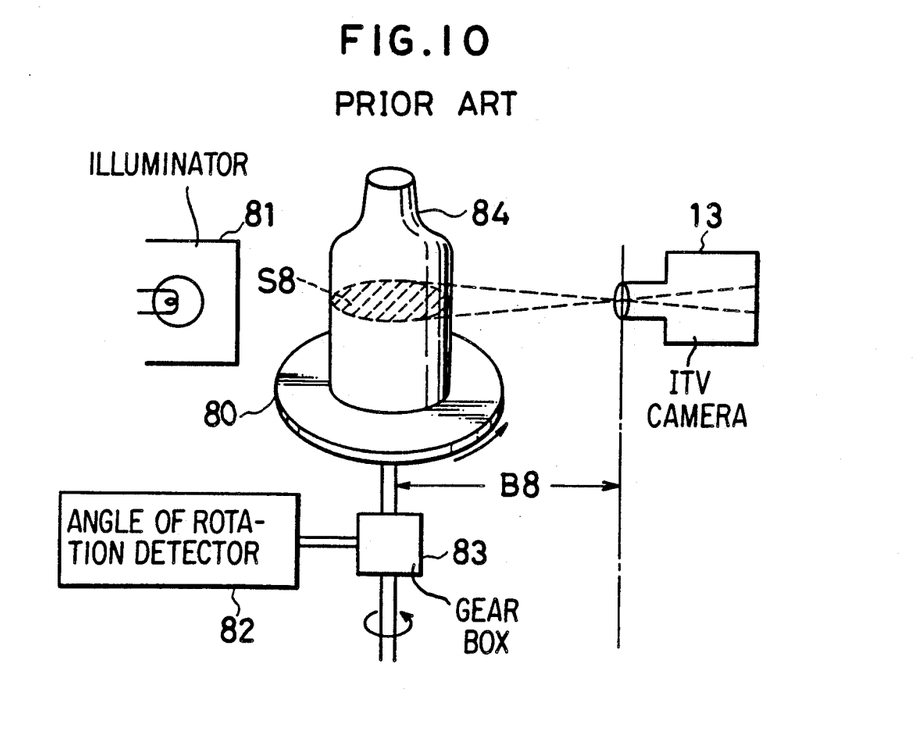
FIG. 10 is a drawing showing the general arrangement of an example of a conventional apparatus for measuring the cross-sectional form of an object using a single ITV camera.

FIG. 10 is a drawing showing the general arrangement of a conventional apparatus for measuring the cross-sectional form of an object using a single ITV camera. The apparatus comprises a revolving platform 80 for rotating a measurement object 80 which is mounted on the revolving platform 80; illumination means 81 for illuminating the measurement object 84; an angle of rotation detector section 82 for detecting the angle of rotation of the measurement object 84, that is, the angle of rotation of the revolving platform 84; and an ITV camera 13 located at a position that is a distance B8 from the revolving platform 80. There is also a gear box 83. To obtain an image of the measurement object 84, the object 84 is placed on the revolving platform 80 and the revolving platform 80 is rotated intermittently by predetermined angles of rotation and an image of the object is taken by the ITV camera 13 at each predetermined angle of rotation. For this, the angle of rotation of the revolving platform 80 is measured by the angle of rotation detector section 82.

To obtain stable binary picture images, the measurement object 84 is backlit by means of the illumination means 81 to process the background as "light" and the measurement object as "dark".

The measurement principle of this apparatus is that at each predetermined angle of rotation by which the revolving platform 80 is turned an image of the measurement object 84 is obtained by the ITV camera 13 to thereby provide projection images of the measurement object 84 from numerous directions. These numerous projection images are then used to obtain groups of projection lines that represent functions of the angles of rotation and the distance B8. Because these projection line groups all contact the horizontal cross-sectional contour of the measurement object 84 at the height of the ITV camera 13, that is, the horizontal cross-sectional boundary line of the object, the horizontal cross-sectional form S8 of the measurement object 84 can be determined by obtaining the envelope of the projection line groups.

Figure 11:
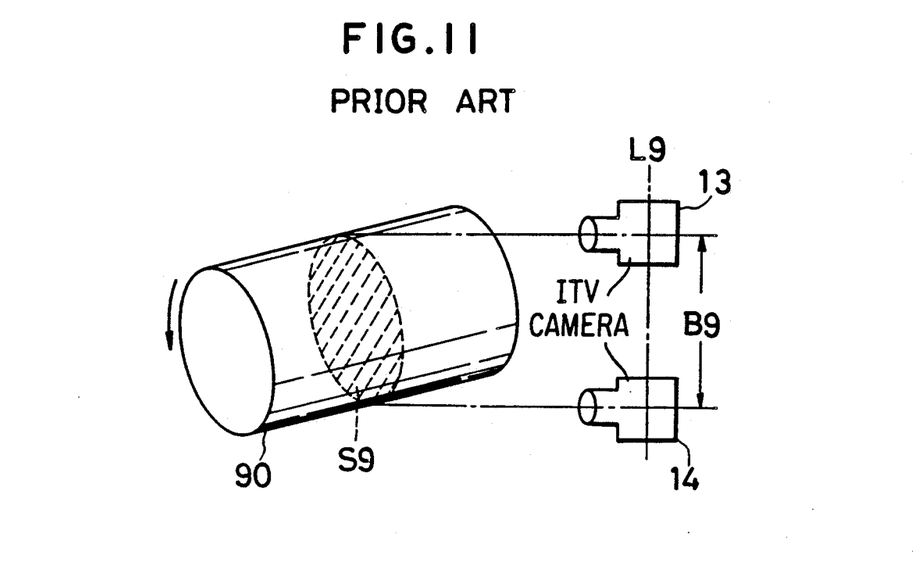
FIG. 11 is a drawing showing the general arrangement of an example of a conventional apparatus for measuring the cross-sectional form of an object using two ITV cameras.

FIG. 11 is a drawing showing the general arrangement of a conventional apparatus for measuring the cross-sectional form of an object using two ITV cameras.

This measurement apparatus is configured so that images of the upper and lower edges of a measurement object 90 are picked up by two ITV cameras 13 and 14 located on the same line L9 which are separated by a distance B9. To measure cross-sectional contours with this apparatus, the measurement object 90 is rotated intermittently by predetermined angles and at each rotation an image of the upper and lower edges of the object 90 is obtained by the ITV cameras 13 and 14 to thereby obtain diameter values around the perimeter of the measurement object 90.

The center values of the diameter values thus obtained are then superimposed on the coordinate origins and for each of the measured values the coordinates are rotated by an angle that equals each angle of rotation of the measurement object 90. The cross-sectional form S9 of the measurement object 90 is obtained by connecting the points denoting the diameter values obtained by the above operations.

Thus, a number of conventional methods have been developed relating to measuring the form of an object. However, the restrictions and constraints imposed by these methods relating to the object measurement or the measurement environment have limited their range of application.

For example, in the measurement of cross-sectional form using the apparatus shown in FIG. 10, the projection line groups obtained by the imaging are represented as functions of the angle of rotation of the measurement object 84 and revolving platform 80, and the distance B8 between the revolving platform 80 and the camera 13. Therefore, for measuring cross-sectional form with this apparatus it is necessary to know beforehand the angles of rotation of the object and the distance B8.

However, because in ordinary measurement conditions the angle of rotation of the revolving platform 80 and the distance B8 fluctuate owing to play in the revolving platform, vibration in the measurement system and so forth, in many cases these values become indeterminate. That is, form measurement using the apparatus of FIG. 10 is difficult to apply where the measurement system has a fluctuating rotation or translational motion component.

In the measurement of cross-sectional form using the apparatus of FIG. 11, the cross-sectional form is obtained from the diameter values of the measurement object 90, so the influence of translational motion by the measurement object 90 can be reduced. However, in this method also, the angle of rotation of the measurement object 90 has to be known beforehand. Also, the measurement principle cannot be applied to objects with gleichdick forms.

In addition, basically both of the methods illustrated by FIGS. 10 and 11 measure the form using only projection image data of the object, that is, contour tangential data, not picture image data of the object. Because of this, although measurement is possible when the cross-sectional form of the object is convex, the methods are not applicable to concave objects.

Hence, because the conventional methods require restrictions or constraints relating to the object measurement or the measurement environment their range of application has been limited. The need has therefore been to obtain a method and apparatus for measuring form which does not have the conventional restrictions and constraints.

OBJECT AND SUMMARY OF THE INVENTION

The object of the present invention is to provide a more general method and apparatus for measuring the form of objects that is not affected by rotational or translational motion in the measurement system and which can also be applied to the measurement of objects that have concave contours.

In order to achieve the aforesaid object, the object form measurement method according to the present invention comprises using two or more imaging means to obtain an image arranged so that there is a partial overlap of the image areas of the said imaging means; obtaining a continuous, sequential multiplicity of picture images of a measurement object wherein either one of the measurement object or the imaging means is moved relative to the other to provide a partial overlap on the measurement object; detecting a multiplicity of local forms of the measurement object and the connective relationship between such local forms from the picture image signals thus obtained; and using the total results of the thus obtained multiplicity of local forms and the connective relationship to synthesize a stereo image form of the measurement object.

The object form measurement apparatus to implement the above method comprises two or more imaging means arranged so that there is a partial overlap of the image area thereof; movement means for the rotational, translational or curvilinear motion of the measurement object or the imaging means; control means for controlling an arrangement whereby a continuous sequential multiplicity of partially-overlapping picture images of the measurement object are obtained; detection means for detecting a multiplicity of local forms of the measurement object and the connective relationship between such local forms from the picture image signals thus obtained; and synthesizing means for synthesizing the stereo image form of the measurement object from the total results of the thus obtained multiplicity of local forms and the connective relationships thereof.

In accordance with the present invention as described above, the form of the object is measured from a continuous multiplicity of picture images obtained with the rotatory or translational motion. Therefore, the measurement is not affected by the angle of rotation of the revolving platform or by fluctuations in the distance between the measurement object and the ITV cameras, enabling the shape of the object to be readily measured with precision. The invention also enables objects with concave forms to be measured, which conventionally has presented difficult.

Other purposes and features of this invention will be clarified in the ensuing detailed explanation given with reference to the attached drawings.

DETAILED DESCRIPTION OF THE PREFERRED EMBODIMENTS

Figure 1:
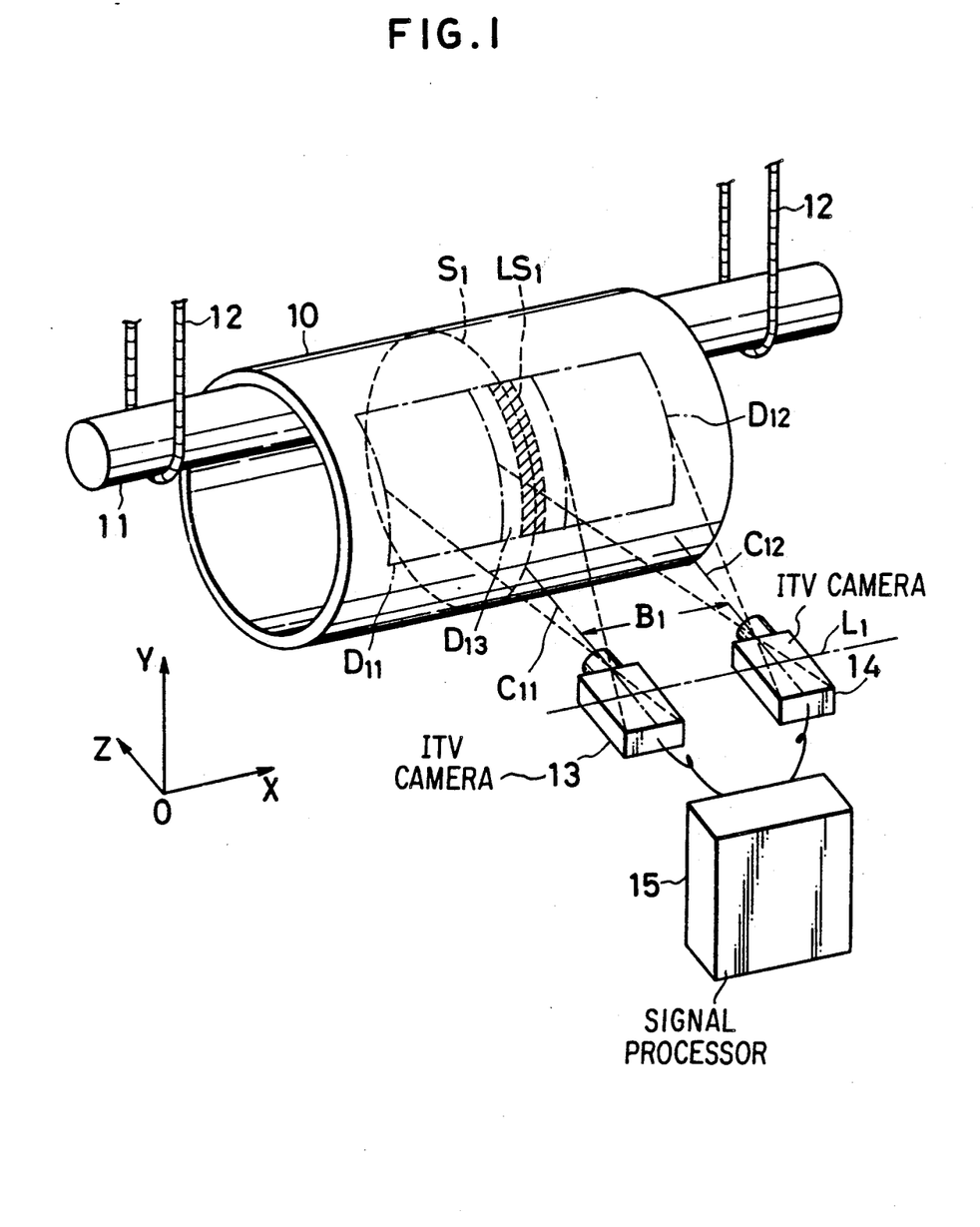
FIG. 1 is an outline view of an arrangement for measuring the form of an object according to the present invention.

FIG. 1 is an outline view of the arrangement of a first embodiment of the present invention. Shown in this drawing is the measurement of the cross-sectional form of a large forged object taken along the y axis during the process of forging the object. Measuring the shape of a large forged object such as this during the forging process has been regarded as difficult because of the high temperature and large size of the object and also because during the forging process the center of rotation and the spatial location of the object are indeterminate. As shown in FIG. 1, a forged measurement object such as this is usually a hollow cylinder which is suspended in the air by looping chains 12 around the ends of a mandrel 11 that is inserted in the measurement object 10. By operating the chains 12 a required rotational or translational motion can be imparted to the measurement object 10.

To measure the cross-sectional form of a large object such as the measurement object 10 described above using the present invention, two cameras, for example ITV cameras 13 and 14 are provided spaced apart by a distance B1 on a base line L1 that is parallel with the x axis of the measurement object 10, facing the measurement object 10 which is to the front along the z axis; the cameras 13 and 14 are also perpendicular to the y axis of the measurement object 10. Therefore, the respective optical axes C11 and C12 of the ITV cameras 13 and 14 are perpendicular to the x axis and parallel to the z axis. Also, the two cameras are positioned to provide a partial overlap D13 of the respective image areas D11 and D12 on the surface of the measurement object 10. Thus, the ITV cameras 13 and 14 are arranged to form a stereo-image system. Picture signals produced by the cameras 13 and 14 are sent to the signal processor 15. The signal processor 15 contains a control section 21 for effecting control whereby as the measurement object 10 is rotated there is an overlap between local images obtained with the cameras 13 and 14; a local cross-sectional form detector section 22 for detecting local cross-sectional form segments LSI of the measurement object 10; a connective relationship detector section 23 for detecting connective relationships between local cross-sectional form segments; and a synthesizing (calculator) section 25 for calculating the total cross-sectional form S1 from results obtained by the detector sections.

To measure the cross-sectional form of an object using the measurement apparatus configured as described, the cameras 13 and 14 are arranged so that the image areas thereof partially overlap on the surface of the measurement object 10. From the two sets of picture data thus obtained, the local cross-sectional form detector section 22 of the signal processor 15 is used to obtain the local cross-sectional form segment LSI of the measurement object 10.

The accuracy of the measurement of the local cross-sectional form segments is determined by the distance B1 between the two cameras 13 and 14 and the focal length of the cameras 13 and 14. The relationship between the accuracy of the said measurement and the scope of the measurement is one of mutual opposition. For example, when high-precision measurement is required it is necessary to set large values for the distance B1 and the focal lengths However, as the said distance and focal lengths become larger, the scope of measurement of local cross-sectional form segments becomes narrower As one example, if the distance to the measurement object is 10 m and the distance B1 between the cameras 13 and 14 is 1 m, when the cameras have a focal length of 0.05 m the scope of measurement of local cross-sectional form segments is 5 m and the maximum measurement error is 0.1 m.

Thus, in an actual measurement, using the above as a reference, the distance B1 and the focal length of the cameras are set in accordance with the required degree of precision.

Next, the measurement object 10 is rotated by an angle, described below, and similarly to the methods described above the local cross-sectional form segments of the measurement object 10 are obtained by the local cross-sectional form detector section 22. The angle of rotation of the measurement object 10 in this case does not have to be a determined value, but it is made a value whereby there is a partial overlap between the preceding image area and the image area after rotation. That is, when the measurement object 10 is imaged, it is controlled by a control section 21 so that the partial overlap exists at all times. The size of the overlap with the preceding image area is determined by balancing the measurement time available against the required precision with which the stereo image of the form of the measurement object 10 is to be reproduced. Specifically, when a large overlap of image area is used, measurement with a good level of precision is possible because it becomes possible to detect the connective relationship between local cross-sectional form segments with a good level of precision. On the other hand, because the angle of rotation of the measurement object is smaller, it becomes necessary to make a larger number of measurements of local cross-sectional form segments and the amount of computations required to calculate the stereo forms also increases, which lengthens the time required for the measurement process.

Therefore, the degree of image area overlap is increased when the priority is measurement precision and reduced when the priority is on carrying out the measurements quickly.

At this time, the local cross-sectional form segment after rotation and the connection position and connection angle between the local cross-sectional form segment obtained at the preceding rotation and the local cross-sectional form segment obtained following rotation, that is, the connective relationship of the local cross-sectional forms, are detected by the connective relationship detector section 23 in the signal processor 15.

The above measurement operations are performed around the perimeter of the measurement object 10 and the local cross-sectional form segment for each partial rotation and the connective relationships therebetween are obtained, and finally, using the local cross-sectional form segments and the connective relationships thus obtained, the synthesizing part obtains the total cross-sectional form S1 of the measurement object 10 by means of the signal processor 15.

Figure 2:
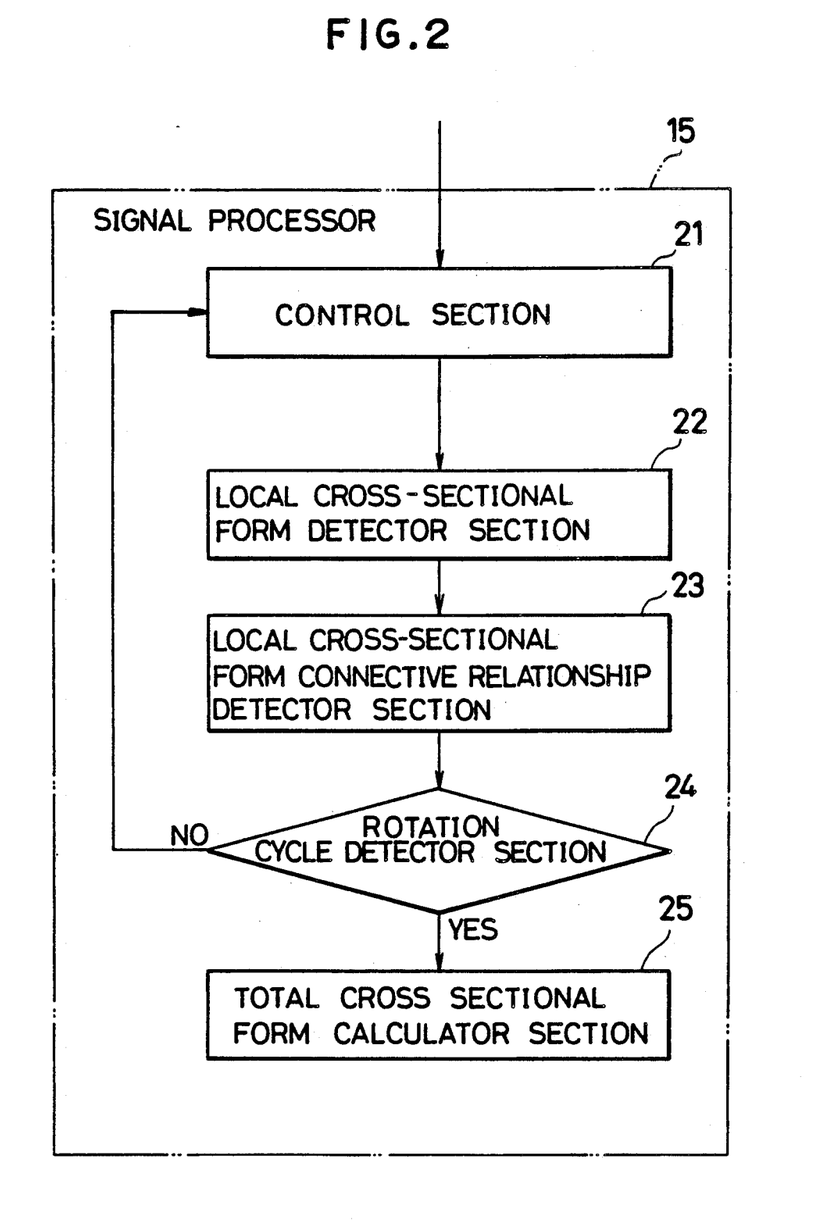
FIG. 2 shows the configuration of the signal processing means in an apparatus for measuring the form of an object according to the present invention.

FIG. 2 shows a specific example of the configuration for the detector sections of the signal processor 15 shown in FIG. 1. First, the measurement object 10 in an initial state is imaged by the cameras 13 and 14 and the two picture signals thus obtained are input into the local cross-sectional form detector section 22 and the imaged local cross-sectional form segments of the measurement object are calculated based on the stereo image principle.

The local cross-sectional form connective relationship detector section 23 detects the connective relationship between the local cross-sectional form segment obtained in the preceding rotation and the local cross-sectional form segment obtained in the following rotation, that is, the connective relationship between the local cross-sectional form segments obtained during the $(i-1)$th rotation and the $(i)$th rotation. Here, connective relationship between local cross-sectional form segments refers to the connection position and connection angle between local cross-sectional form segments As there are no $(i-1)$th rotational data when the measurement object 10 is in its initial state, the connective relationship data are also set to the initial values.

The rotation cycle detector section 24 for determining whether the measurement object 10 has made one revolution, i.e., whether the perimeter of the measurement object 10 has been imaged. This is decided according to whether the picture image when the measurement object 10 has rotated once coincides with the initial-state picture image. If the measurement object 10 has not made one revolution the measurement object 10 is rotated further and the above operation cycle of detection of the local cross-sectional form segment and of the connective relationship between the local cross-sectional form segments is repeated.

If the measurement object 10 has made one revolution, rotation of the measurement object 10 is stopped and the total cross-sectional form of the measurement object 10 is calculated by the total cross-sectional form calculator section (synthesizing section) 25. Basically, the total cross-sectional form of the measurement object 10 is that obtained by connecting up the local cross-sectional form segments in the sequence of the connection position and angle of rotation of the measurement object 10.

Figure 3:
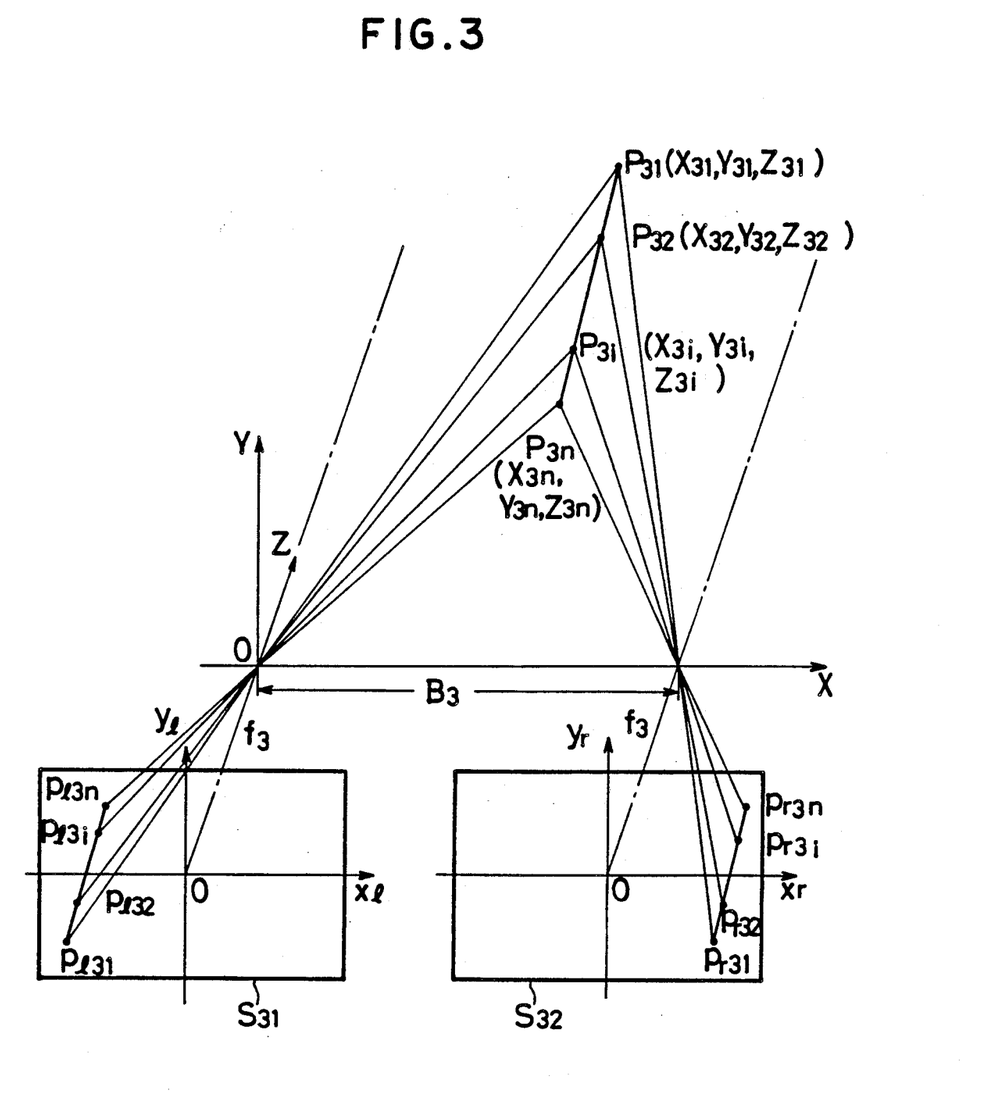
FIG. 3 is an explanatory drawing illustrating the principle of measuring local cross-sectional form segments according to the invention.

FIG. 3 is a drawing showing the principle of measurement of the local cross-sectional form segment of the measurement object 10 according to this arrangement. In FIG. 3, points P31, . . . ,P3$n$ on the measurement object are projected onto xl, yl coordinate points p131, . . . ,p13$n$ of camera imaging surface S31 and xr, yr coordinate points pr31, . . . ,pr3n of camera imaging surface S32.

When the focal length of both of the ITV cameras 13 and 14 is f3 and the distance between the cameras on the x axis, i.e., the length of the base line, is B3, then the distance Z31, . . . ,Z3n of a point P31, . . . ,P3n along the Z axis can be obtained by the following equation.

$$Z3i = \frac{B3 \cdot f3}{xr3i - xl3i}$$

Here, $i = 1, 2, \ldots, n$

Also, the respective positions of Y31, . . . ,Y3n along the y axis and x31, . . . ,x3n along the x axis are $$Y3i = \frac{Z3i}{f3} \cdot yl3i$$

$$X3i = \frac{Z3i}{f3} \cdot yl3i$$

Here, $i = 1, 2, \ldots, n$

Therefore the set of the spatial locations (X3i, Y3i, Z3i) of points P31, . . . ,P3n on the measurement object, i.e., the local cross-sectional form segments, can be obtained by detecting corresponding points in the two pictures obtained by the ITV cameras.

Thus, in this arrangement picture image data are used to measure local cross-sectional form segments of the measurement object and obtain the total form of the measurement object, and contour tangential data are not used. This mean that objects with concave forms can also be measured.

Figure 4:
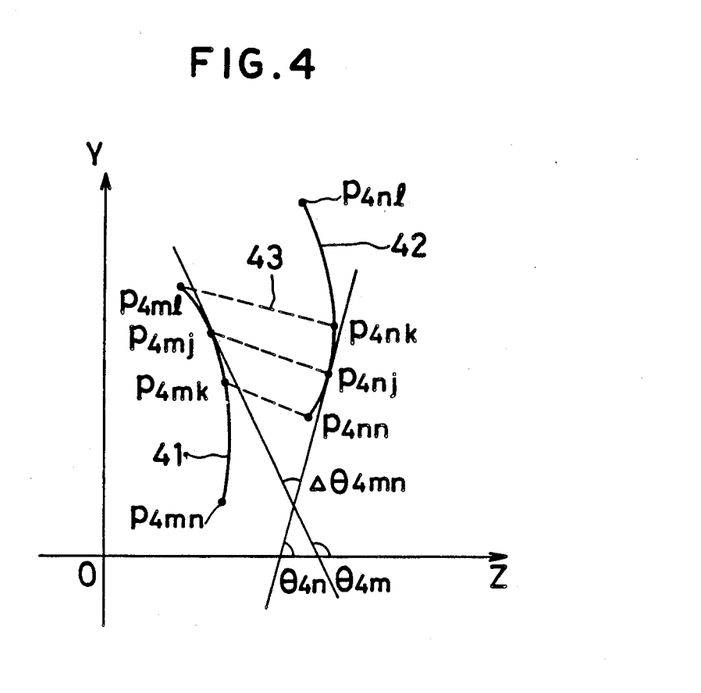
FIG. 4 is an explanatory drawing illustrating the principle of the detection of the connective relationship between local cross-sectional form segments, in the present invention.

FIG. 4 shows the principle of the detection of connective relationships between local cross-sectional form segments. In FIG. 4, local (cross-sectional) forms 41 are local cross-sectional form segments obtained at the (i−1)th rotation, and local cross-sectional form segments 42 are likewise local cross-sectional form segments obtained at the (i)th rotation.

As explained with reference to the measurement method shown in FIG. 1, the local cross-sectional form segments 41 and 42 are measured in a partially overlapped state. Connection position 43 showing the connective relationship of the local cross-sectional form segments refers to this overlapping portion of the local cross-sectional form segments, and can be obtained by taking the correlation of the respective picture signals of the (i−1)th local cross-sectional form segment 41 and (i)th local cross-sectional form segment 42.

In FIG. 4 the part p4ml, . . . ,p4mk and the part p4nk, . . . ,p4nn show the connection position obtained by image correlation.

Connection angle Δθ4mn between local cross-sectional form segments is defined as the differences in the deflection angles of each of the local cross-sectional form segments at the connection position 43 of the local cross-sectional form segments. In FIG. 4 these are obtained as the difference Δθ4mn(=θ4m−θ4n) between the deflection angles θ4m and θ4n at the respective connection positions.

Thus, the connective relationship between the connection position and the connection angle of the local cross-sectional form segments thus obtained are based not on absolute spatial locations on the measurement object, but is obtained just from relative positional relationships between local cross-sectional form segments. As such, the total cross-sectional form of the measurement object calculated using these relationships is unaffected by rotational fluctuations or translational motion in the measurement system.

The operating principle of the total cross-sectional form computation section is, basically, that local cross-sectional form segments obtained with the above rotations are sequentially rotated by the connection angle of each in the measurements, and realized by connecting up the connection positions. However, when it is only a case of connecting local cross-sectional form segments, when there is measurement error, the error accumulates with the progress of the connections and may result in the total cross-sectional form not forming a closed curve. To obtain the total cross-sectional form with the present invention, using the data of all of the local cross-sectional form segments, with the constraining conditions being the connection position and connection angle of each of the local cross-sectional form segments, the local cross-sectional form segment at the initial state and the connection position and connection angle at the terminal local cross-sectional form segment after one revolution, using a method such as the least squares method to obtain values that are optimally satisfactory in form for the spatial positional relationship of all of the local cross-sectional form segments simultaneously to provide results with the highest degree of certainty. The measurement has been described with reference to measurement of cross-sectional form along the y axis of the measurement object. However, for the total form of a measurement object, i.e., the stereo form, the above cross-sectional measurement can be performed continuously while moving both of the cameras 13 and 14 in the direction of the x axis and the stereo form expressed as laminations of the multiplicity of cross-sectional forms thereby obtained.

In the foregoing embodiment the present invention has been described with reference to th cross-sectional form measurement of a forged object. However, the invention can also be applied to the form measurement of other types of objects.

Figure 5:
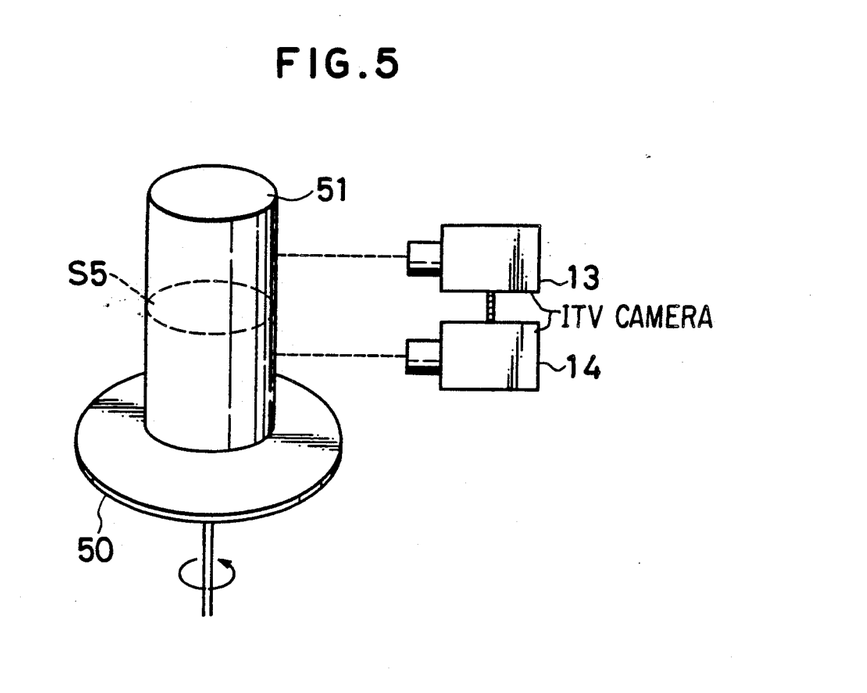
FIG. 5 shows the general arrangement for measuring the form of an object according to a second embodiment of the present invention.

The embodiment shown in FIG. 5 is for measuring the cross-sectional form S5 of a measurement object 51 provided on a revolving platform 50, using two ITV cameras 13 and 14 mounted vertically.

In the arrangement shown in FIG. 5, the method of measuring the cross-sectional form of the measurement object 51 is the same as the one described with reference to FIG. 1. That is, the revolving platform 50 is used to rotate the measurement object 51 by required angles of rotation while the ITV cameras 13 and 14 are used to image the measurement object 51 at each position. The picture images thus obtained are used to obtain the local cross-sectional form segments and the connective relationship and calculate the total cross-sectional form.

A characterizing feature of the measurement method of the present invention is that it is not affected by fluctuation in the rotation in the measurement object or by translational motion, therefore with this configuration it is not necessary for the revolving platform 50 to be a precision mechanism, nor is the angle of rotation detector section required.

Figure 6:
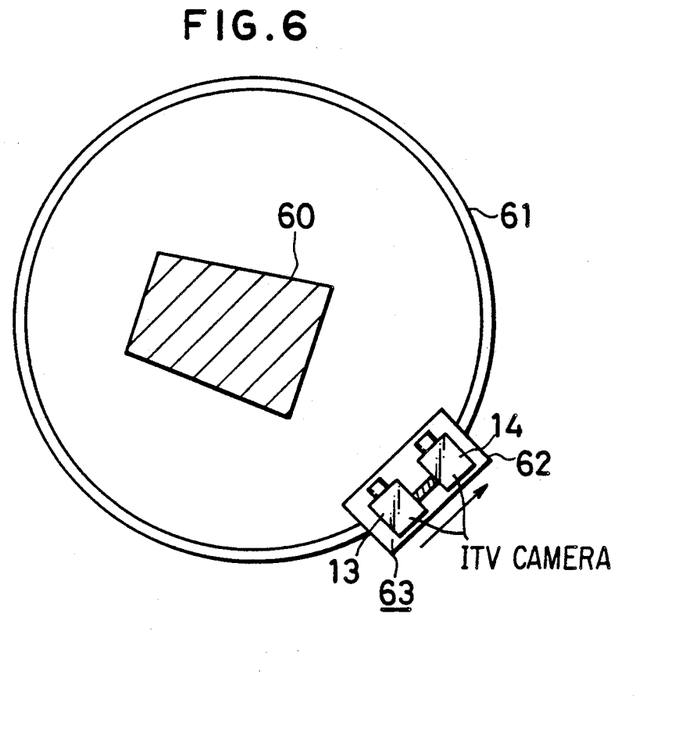
FIG. 6 shows the general arrangement for measuring the form of an object according to a third embodiment.

In the embodiment illustrated in FIG. 6 the measurement object 60 is fixed and the form measurement apparatus (imaging apparatus) of the invention is moveable.

In general measurement conditions, there are many cases where the measurement object is a fixed one such as a building structure or where the object is so large that it is difficult to rotate it. In such cases, by using a configuration whereby the measurement object is fixed and the form measurement apparatus can be moved around the perimeter of the measurement object, a measurement system can be arranged that is relatively identical to the method of FIG. 1. In such cases too, based on the principle of the present invention it becomes possible to measure the cross-sectional form of a measurement object.

In FIG. 6, the cross-sectional form of the measurement object 60 is measured by, for example, a form measurement apparatus 63 mounted on a moving means 62 on a track or path 61 provided around the perimeter of the measurement object 60. As will be clear from the principle of the present invention, it is not essential that the path 61 be in the shape of a circle; it is sufficient for it to be formed as a closed curve.

Figure 7:
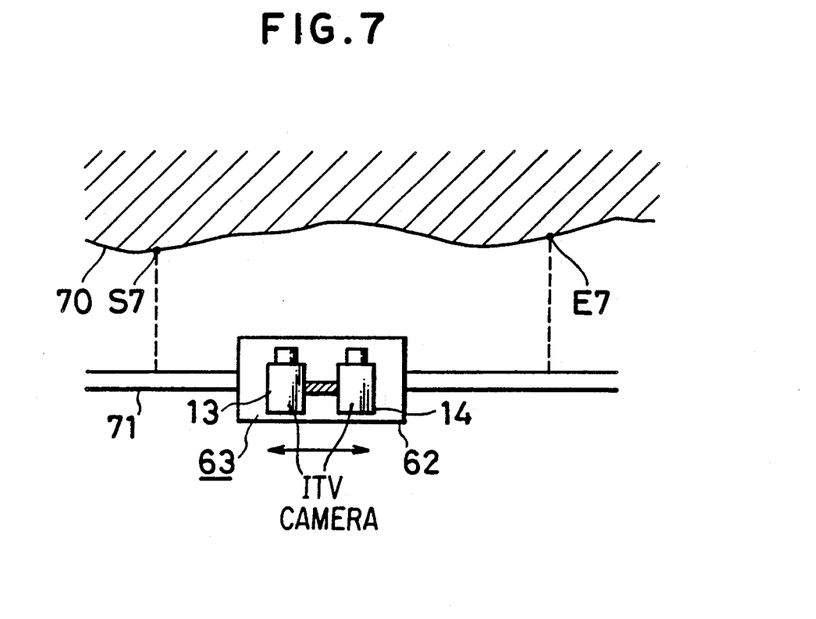
FIG. 7 shows the general arrangement for measuring the form of an object according to a fourth embodiment.

FIG. 7 shows an example of the present invention applied to the measurement of the surface form of a measurement object rather than the cross-sectional form. In FIG. 7 the measurement object 70 is, for example, fixed to a wall and the form measurement apparatus 63 is mounted on a moving means 62 on a straight track or path 71 provided in front of the measurement object 70.

Measurement is carried out by moving the form measurement apparatus 63 from a start point S7 to an end point E7 while measuring partially overlapping local segments of the surface. When the measurement apparatus 63 reaches the end point E7, measurement of local segments of the surface is then carried out in reverse, going from the end point E7 to the start point S7.

That is, measurement of local surface segments is carried out by reciprocally traversing the measurement object 70. The reason for this arrangement is that if measurement is carried out using just a reciprocal path or multiple paths, the constraining conditions of the final local surface segment form cannot be specified, owing to which error is produced in the measurement results. In effect, this method can be considered as being equivalent to the cross-sectional form measurement of an object that has zero depth.

In the configuration of FIG. 7 the measurement object is fixed. However, in cases where the measurement object can be moved the measurement apparatus can be fixed and the measurement object moved to carry out the above surface form measurement.

An embodiment of the present invention will now be described. The measurement object is a steel cylinder 4 m long with a radius of 2 m. The cylinder is laid on its side and two ITV cameras with a focal length of 50 mm and spaced apart by 1 m are positioned 10 m from the axis of the cylinder. The cylindrical object is imaged by the cameras, then partially rotated five times, to 54.7, 103.6, 148.7, 195.6 and 248.8 degrees and imaged at each rotation to image the perimeter of the cylinder.

Figure 8:
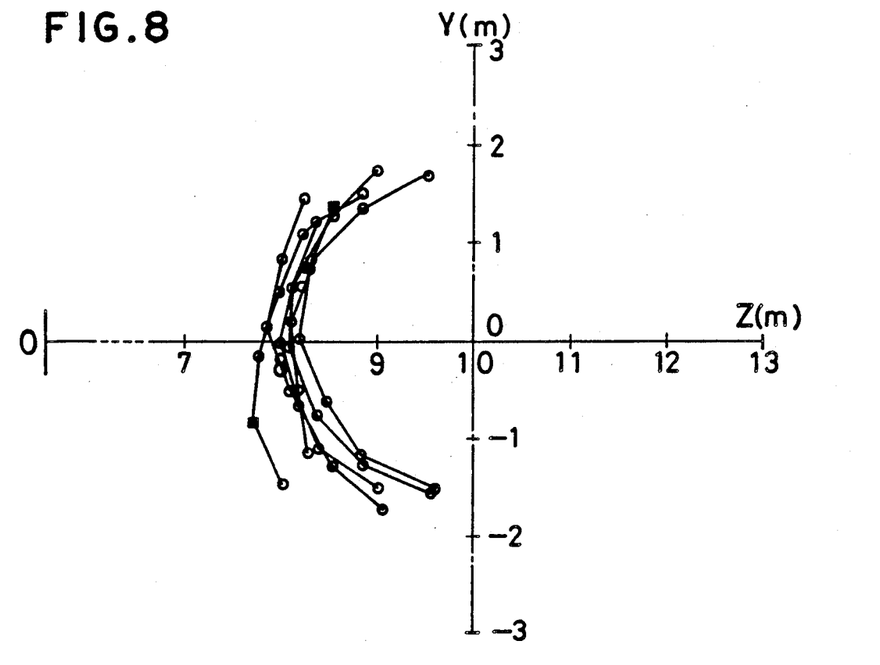
FIG. 8 shows local cross-sectional form segments of a cylindrical object at each angle of rotation, using the method of this invention.

FIG. 8 shows the local cross-sectional form segment at each rotation position of the cylinder, obtained using the image data provided by the two cameras and processed by the local cross-sectional form detector section. Owing to indeterminate factors such as the center of rotation and rotation angle, irregular spatial positions are measured.

Figure 9:
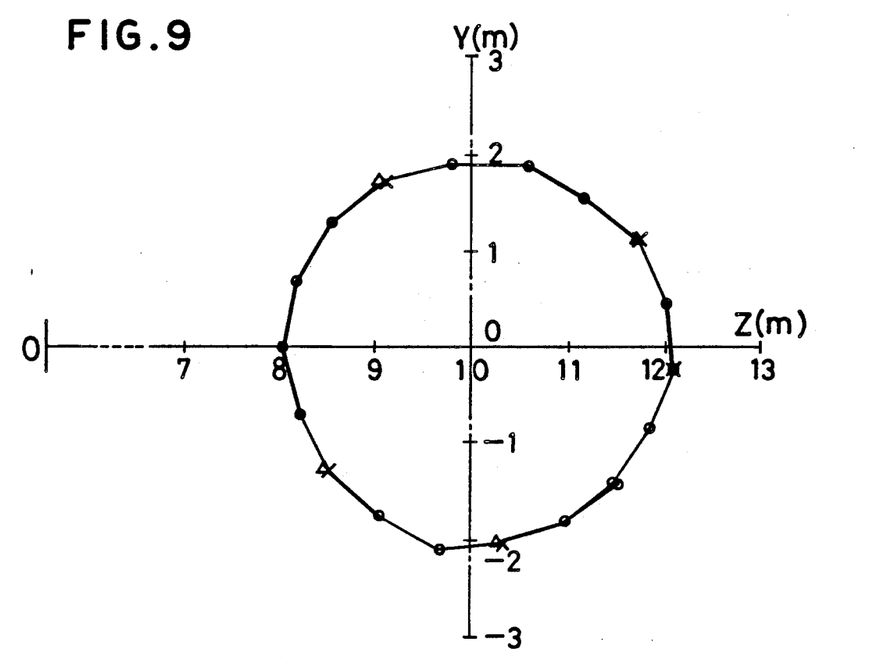
FIG. 9 shows the local cross-sectional form segments of FIG. 8 in connected form.

In FIG. 9, the local cross-sectional form segments measured as described above are shown as measurement object cross-sectional forms after further processing by the connective relationship detector section. The measurement result is an average radius of 2.003 m, with a circumscribed circle radius of 2.092 m and an inscribed circle radius of 1.933 m, giving a roundness of 0.159 m.

As has been described, with the present invention measurement does not rely on absolute angles of rotation of the measurement object nor on the amount of translational movement or on contour data. Instead, local forms are obtained on the basis of picture image data of the measurement object, and the relative connective relationship between these local forms is used as a basis for calculating the optimum spatial position of all of the local forms, i.e., to obtain a stereo form. Therefore, it is possible to measure the form unaffected by the various fluctuations in the measurement system, and the invention can also be applied to concave objects, so that by extension, the volume of an object can be readily computed from the stereo form.

What is claimed is:

1. An object form measuring method comprising the steps of:
    using at least two imaging means to obtain a picture image including a partial overlap of image areas of the respective imaging means at a surface of a measurement object having a form to be measured;
    obtaining a continuous, sequential multiplicity of picture images of the measurement object from different angular positions about substantially an entire periphery of the measurement object, wherein either one of the measurement object or the imaging means is moved relative to the other to provide a partial overlap between a preceding picture image and a subsequent picture image of the measurement object;
    detecting a multiplicity of local forms of the measurement object and a connective relationship between each of the multiplicity of local forms from the picture images obtained, wherein the connective relationship includes a connective position and a connective angle obtained between a local cross-sectional form segment of the measurement object generated from preceding and subsequent picture images of the measurement object; and
    using the multiplicity of local forms and the associated connective relationships to synthesize a stereo image form of the measurement object.

2. The object form measurement method according to claim 1 wherein either one of the measurement object or imaging means is rotationally moved.

3. The object form measurement method according to claim 1 wherein either one of the measurement object or imaging means is translationally moved.

4. The object form measurement method according to claim 1 wherein either one of the measurement object or imaging means is moved curvilinearly.

5. An object form measuring apparatus comprising:
    at least two imaging means for obtaining a picture image including a partial overlap of image areas of the respective imaging means at a surface of a measurement object having a form to be measured;
    means for obtaining a continuous, sequential multiplicity of picture images of the measurement object from different angular positions about substantially an entire periphery of the measurement object, wherein either one of the measurement object or the imaging means is moved relative to the other to provide a partial overlap between a preceding picture image and a subsequent picture image of the measurement object;

detecting means for detecting a multiplicity of local forms of the measurement object and a connective relationship between the local forms from the picture images obtained, wherein the connective relationship includes a connective position and a connective angle between a local cross-sectional form segment of the measurement object obtained between preceding and subsequent picture images of the measurement object; and stereo image synthesizing means for using the multiplicity of local forms and the associated connective relationships to synthesize a stereo image form of the measurement object.

* * * * *

UNITED STATES PATENT AND TRADEMARK OFFICE
CERTIFICATE OF CORRECTION

PATENT NO. : 4,993,836

DATED : February 19, 1991

INVENTOR(S) : Nakatomo Furuhashi et al

It is certified that error appears in the above-identified patent and that said Letters Patent is hereby corrected as shown below:

ON THE TITLE PAGE:   Item [73]

The Assignee information is incorrect, should be,

--Agency of Industrial Science & Technology, Ministry of

International Trade & Industry, Tokyo, Japan--.

Signed and Sealed this

Twenty-fourth Day of November, 1992

Attest:

DOUGLAS B. COMER

*Attesting Officer*   Acting Commissioner of Patents and Trademarks